(No Model.) 2 Sheets—Sheet 1.
F. T. GILBERT.
GANG HOE.
No. 351,028. Patented Oct. 19, 1886.
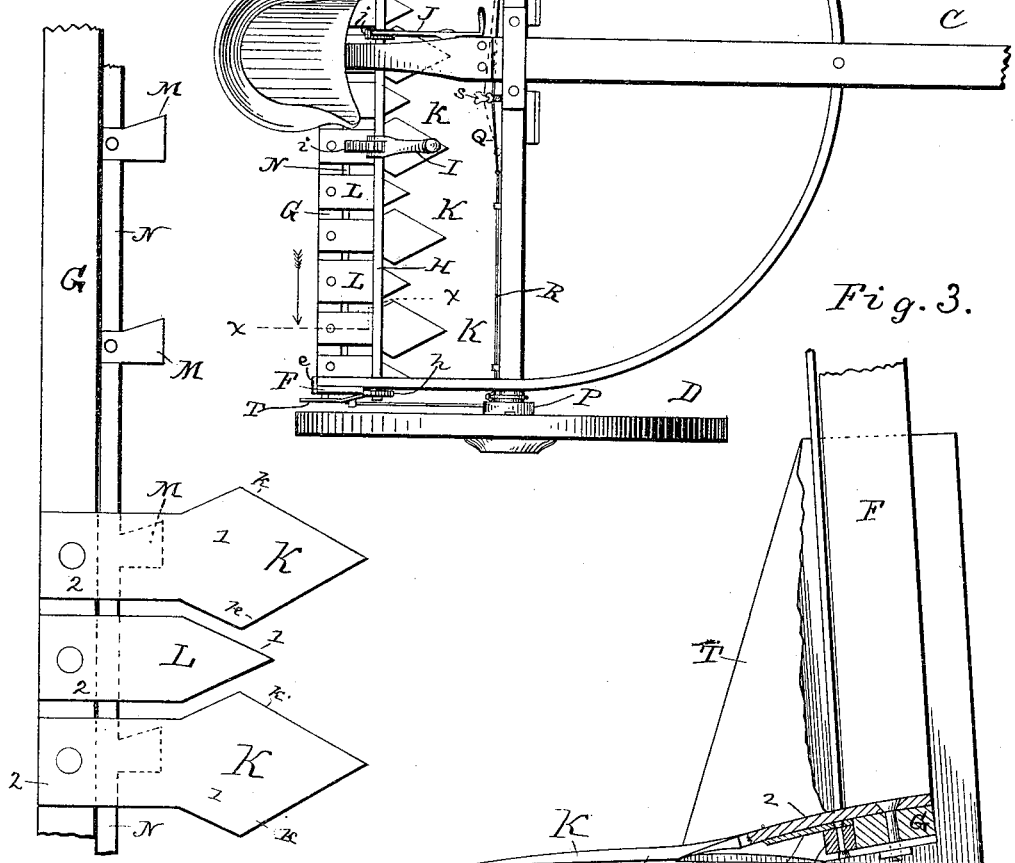
WITNESSES:
Thos. Houghton.
P. B. Turpin.
INVENTOR:
F. T. Gilbert
BY Munn & Co.
ATTORNEYS.

(No Model.) 2 Sheets—Sheet 2.
F. T. GILBERT.
GANG HOE.
No. 351,028. Patented Oct. 19, 1886.
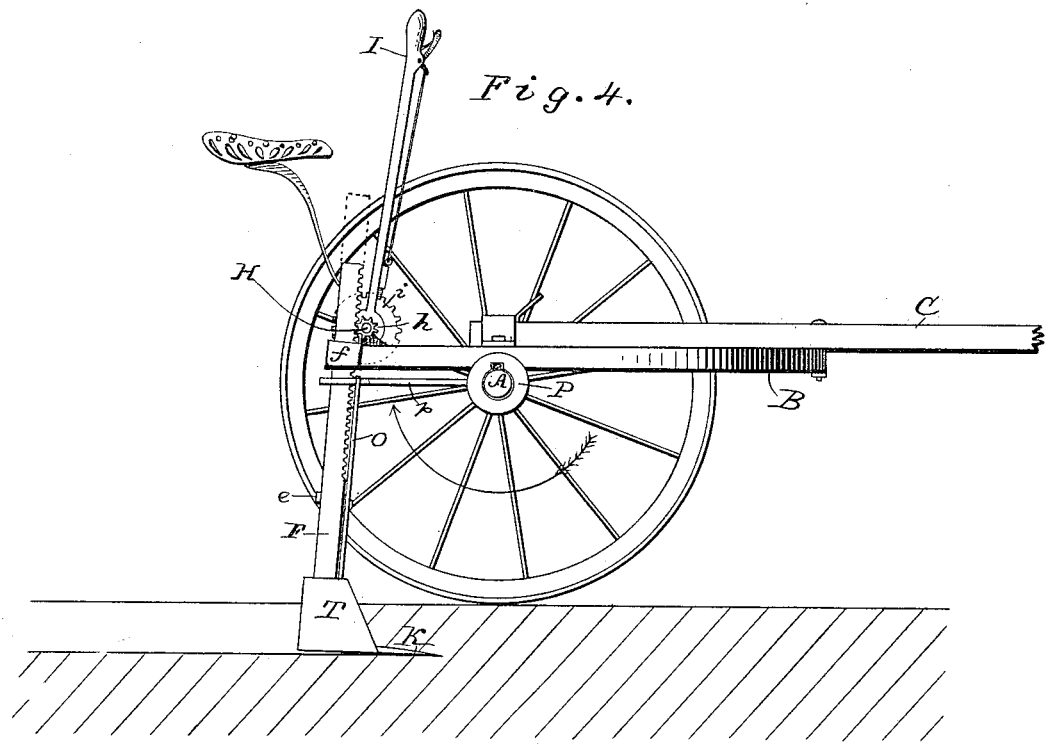
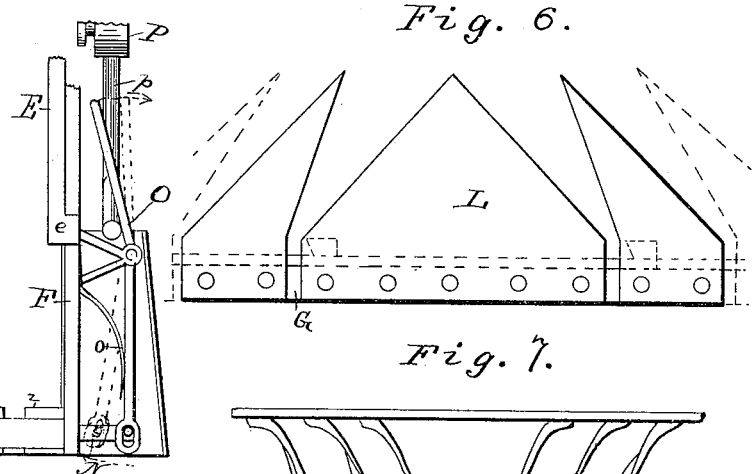
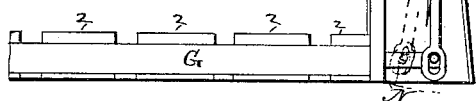
WITNESSES:
Thos. Houghton.
P. B. Turpin.
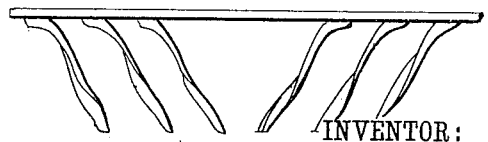
INVENTOR:
F. T. Gilbert
BY Munn & Co.
ATTORNEYS.

United States Patent Office.

FRANKLIN T. GILBERT, OF WALLA WALLA, WASHINGTON TERRITORY, ASSIGNOR TO ORLEY HULL, OF SAME PLACE.

GANG-HOE.

SPECIFICATION forming part of Letters Patent No. 351,028, dated October 19, 1886.

Application filed November 12, 1885. Serial No. 182,614. (No model.)

*To all whom it may concern:*

Be it known that I, FRANKLIN T. GILBERT, of Walla Walla, in the county of Walla Walla, Washington Territory, have invented a new and useful Improvement in Gang-Hoes, of which the following is a description.

My invention is an improved gang-hoe intended especially for use in destroying weeds; and it consists in certain features of construction and combination of parts, as will be hereinafter described.

In the drawings, Figure 1 is a top plan view of my machine. Fig. 2 is a detail plan view of a part of the hoes and the support therefor. Fig. 3 is a detail sectional view on line $x$ $x$, Fig. 1, illustrating the housing of the side supports and the sickle-operating lever. Fig. 4 is a side elevation of the machine, one wheel being removed. Fig. 5 is a partial rear elevation of the machine. Fig. 6 shows a different form of hoe from that shown in Figs. 1 and 2. Fig. 7 is a detail view of the pulverizer, all of which will be described.

The main frame is shown consisting of the axle A, the arch B, and the pole C. The wheels D D' are spindled on the ends of the axle, the hub of wheel D being formed on its inner side with a clutch-section fitted to be engaged by the clutch-section on the hub which carries the sickle-operating arm. At its rear end the main frame is provided with depending arms E, bent, preferably, from the ends of arch B, and provided at their lower ends with guides $e$ for the uprights F. These uprights project upwardly from the opposite ends of the hoe-supporting bar G and pass through guides $e$, and thence upward through loops $f$ on the arch B. I provide these uprights with rack-teeth for engagement by the pinions $h$, fixed on shaft H, which latter is journaled in the main frame, and may be revolved by a lever, I, pivoted on the shaft, and having a hand-pawl by which to engage a toothed wheel, $i$, fixed on the shaft. By adjusting the hand-pawl to different teeth of the wheel $i$ it may be set to suit different persons or for getting a new hold in elevating or depressing the uprights. On the shaft H, I secure a toothed wheel, $j$, and provide a detent-pawl, J, to engage such wheel, and arrange such pawl so it may be released by the foot of the operator and will fall by gravity into engagement with the wheel. By this detent the shaft may be held at any desired point to which it may be raised, to permit the adjustment of the lever I to secure a fresh hold, as will be understood.

Hoes K L are secured on the bar G in alternating series, and are formed with blades 1 and stems 2, the latter being extended rearwardly and inclined upwardly, as shown most clearly in Fig. 3. By this arrangement the dirt is directed upward over the hoe-bar, and the latter offers practically no obstruction to the advance of the machine.

The hoes K are arranged usually in advance of L, and have their cutting edges $k$ extended so they will lap in front of the cutting-edges of the said hoes L, as shown most clearly in Figs. 1 and 2. This construction, it will be seen, presents, practically, a continuous cutting-edge without meeting the resistance such an unbroken edge presents.

While the construction as shown in Figs. 1 and 2 may be used, it will be understood that the construction shown in Fig. 6 might be preferred, because it enables the points of the several hoes to be ranged in a common transverse line. In this construction, instead of employing a series of hoes, L, a single wide hoe is employed, and hoes are provided, one at each end, which have their cutting-edges lapped past the line of the edges of the hoe L, and are in this respect similar to the construction shown in Figs. 1 and 2, but differing therefrom in that they do not extend in front of the hoe L.

Where desired, the end hoes, as shown in Fig. 6, may be duplicated to the proper number to make a hoe-bar of the desired length, the hoe L being the center, and the end hoes ranging in equal numbers on opposite sides thereof, as partially indicated in dotted lines, Fig. 6.

Where desired, the clod-crusher shown in Fig. 7 may be attached to the rear of the hoe-supporting bar to pulverize soil in a greater degree than is accomplished by its being raised over the hoe-bar by the inclination afforded by the hoes, as before described.

In operation dead grass and weeds occasionally get caught between the hoes in front of the bar and operate as a clog. To cut out this accumulation I provide the sickles M, secured on a bar, N, movable close to and in front of the hoe-supporting bar. The bar N is movable, so its blades M may be moved across the space between the hoes and cut the weeds and grass therein so they may pass from the machine. The cutting-edges m of the blades are inclined inwardly from their forward to their rear edges, so such edges will not be dulled by contact with the soil when between the blades, but such earth by passing over such edges will operate rather to sharpen the cutting-edges of the sickle, as will be understood from Fig. 2. While this sickle-bar may be operated by hand, I prefer to operate it by the lever O and hub P, having arm p. The lever O is pivoted between its ends to one of the uprights, and has its lower end connected with the sickle-bar, and such end is held by spring o normally in the position shown in Fig. 5, to secure the sickle-blade below the hoes, as shown in Fig. 2. The upper end of the lever is arranged in the path of the arm p, fixed on the hub P. This hub is sleeved on and movable along the axle next to the hub of wheel D, and has a clutch-section fitted to engage that of such hub when the hubs are moved into contact. The arm of hub P, it will seen, strikes the upper arm of the lever O, and operates said lever and the sickle-bar to the position indicated by dotted lines, Fig. 5, the spring o operating to return the lever and the sickle-bar. Two or more of the arms p may be employed, where so desired.

To move hub P into engagement with hub D, I usually employ the construction shown in Fig. 1, consisting of a bow-shaped rod, Q, having one end secured at q to the axle and having its opposite end connected by rod R with the hub P. A set-screw, S, turns through the bow Q at its center and into the axle. By adjusting this screw the bow may be set toward or from the axle and the hubs consequently moved into and out of the clutch in order that the sickle-bar may be operated at pleasure.

To protect the lower end of the uprights, I provide housings T, which fit over the lower ends of such uprights. These housings have sharp front edges, in order that they may present the least resistance to the motion of the machine. It will be understood that the housing on one side fits over the lever O.

In the operation of my machine the hoes run below the ground surface at any desired depth, which may be regulated by the mechanism before described.

By the described construction the weeds are cut off and killed, and the soil being raised as it passes over the rear ends of the hoes it is efficiently broken up and pulverized.

Having thus described my invention, what I claim as new is—

1. A gang-hoe comprising a main frame, a hoe-supporting bar, uprights connecting such bar with the main frame, and adjustable connections between said uprights and the main frame, whereby the hoe-bar may be set to and held at any suitable position into or out of the ground, substantially as set forth.

2. The combination of the main frame, the hoe-supporting bar, the uprights connecting the latter with the main frame, and housings for the lower ends of the uprights, substantially as set forth.

3. The combination of the hoe-bar, the hoes supported thereon and having their adjacent edges formed in lines approximately parallel to each other and at an incline to the direction of movement, and a sickle-bar having cutting-blades arranged in rear of the inclined edges of the hoes, substantially as set forth.

4. The combination of the hoe-supporting bar, the uprights extended therefrom, and the main frame having depending arms provided at their lower ends with guides for the uprights, substantially as and for the purposes specified.

5. The combination of the hoe-supporting bar, the hoes secured thereto, the sickle-bar, the lever O, pivoted between its ends and having its lower end connected with the sickle-bar, a spring arranged to engage the lever O, and the hub P, having an arm, p, whereby to engage the lever O, substantially as set forth.

6. In a gang-hoe, the combination, with the supporting-bar, of a number of hoes secured to said bar and having their forward ends bent or deflected laterally, whereby the cutting-edge of one hoe will lap the cutting-edge of the adjacent hoe, substantially as set forth.

7. A gang-hoe having a hoe bar or support provided with a number of hoes arranged in a common plane and having the cutting-edge of one hoe lapping the cutting-edge of the adjacent hoe, said cutting-edges being arranged at angles to the hoe-bar, substantially as set forth.

8. In a gang-hoe, a supporting-bar provided with a number of hoes having their forward ends bent or deflected laterally and arranged in series on opposite sides of the center, the hoes on opposite sides of the center being deflected toward the same, the deflected portions of said hoes lapping the cutting-edges of the adjacent hoes, substantially as shown and described.

FRANKLIN T. GILBERT.

Witnesses:
SOLON C. KEMON,
CHAS. A. PETTIT.